United States Patent
Xie et al.

(10) Patent No.: US 10,261,393 B2
(45) Date of Patent: Apr. 16, 2019

(54) METHOD FOR CONTROLLING INFRARED ILLUMINATOR AND RELATED IMAGE-RECORDING DEVICE

(71) Applicant: Sengled Co., Ltd., Shanghai (CN)

(72) Inventors: Shengli Xie, Shanghai (CN); Xiaoping Zhu, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 0 days.

(21) Appl. No.: 15/738,062

(22) PCT Filed: Dec. 13, 2016

(86) PCT No.: PCT/CN2016/109626
§ 371 (c)(1),
(2) Date: Dec. 19, 2017

(87) PCT Pub. No.: WO2017/114151
PCT Pub. Date: Jul. 6, 2017

(65) Prior Publication Data
US 2018/0196334 A1    Jul. 12, 2018

(30) Foreign Application Priority Data

Dec. 28, 2015 (CN) .......................... 2015 1 1002624

(51) Int. Cl.
*H04N 5/33* (2006.01)
*G03B 15/03* (2006.01)
(Continued)

(52) U.S. Cl.
CPC ............. *G03B 15/05* (2013.01); *G03B 15/03* (2013.01); *G03D 3/00* (2013.01); *H04N 5/217* (2013.01);
(Continued)

(58) Field of Classification Search
CPC ... H04N 7/18; G03B 7/08; G03B 7/16; G03B 7/17
See application file for complete search history.

(56) References Cited

U.S. PATENT DOCUMENTS 9,386,230 B1 * 7/2016 Duran ................. H04N 5/2351
2012/0200535 A1   8/2012 Stienstra et al.
2015/0373278 A1  12/2015 Hattori et al.

FOREIGN PATENT DOCUMENTS

CN    101750848 A    6/2010
CN    202696753 U    1/2013
(Continued)

OTHER PUBLICATIONS

The World Intellectual Property Organization (WIPO) International search report and written opinion for PCT/CN2016/109626 dated Mar. 13, 2017 p. 11.
(Continued)

*Primary Examiner* — Noam Reisner
(74) *Attorney, Agent, or Firm* — Anova Law Group, PLLC (57) ABSTRACT

A method for controlling an infrared illuminator and a related image-recording device are provided. The method for controlling an infrared illuminator includes: turning on the infrared illuminator in a filming environment to provide light; filtering out light-reflection interference caused by the light to obtain an actual visible illuminance value; and controlling on and off states of the infrared illuminator based on the actual visible illuminance value.

9 Claims, 3 Drawing Sheets

(51) Int. Cl.
*G03B 15/05* (2006.01)
*H04N 5/225* (2006.01)
*H04N 5/235* (2006.01)
*H04N 7/18* (2006.01)
*H04N 5/217* (2011.01)
*G03D 3/00* (2006.01)

(52) U.S. Cl.
CPC ......... *H04N 5/2256* (2013.01); *H04N 5/2354* (2013.01); *H04N 5/33* (2013.01); *H04N 5/332* (2013.01); *H04N 7/183* (2013.01)

(56) References Cited

FOREIGN PATENT DOCUMENTS

| | | |
|---|---|---|
| CN | 202856862 U | 4/2013 |
| CN | 202907058 U | 4/2013 |
| CN | 103327255 A | 9/2013 |
| CN | 105487321 A | 4/2016 |
| EP | 1608157 A2 | 12/2005 |
| EP | 2759256 A1 | 7/2014 |
| JP | 2008083358 A | 4/2008 |
| JP | 2013207709 A | 10/2013 |
| KR | 20040020412 A | 3/2004 |
| KR | 20110015161 A | 2/2011 |
| WO | 2013052383 A1 | 4/2013 |

OTHER PUBLICATIONS

European Patent Office (EPO) Extended European Search Report for PCT/CN2016/109626 Nov. 14, 2018 9 Pages.

\* cited by examiner

METHOD FOR CONTROLLING INFRARED ILLUMINATOR AND RELATED IMAGE-RECORDING DEVICE

CROSS-REFERENCES TO RELATED APPLICATIONS

This application claims the priority of Chinese Patent Application No. 201511002624.80 filed on Dec. 28, 2015, the entire content of which is incorporated herein by reference.

FIELD OF THE DISCLOSURE

The present disclosure generally relates to the field of light emitting diode (LED) technologies and, and more particularly, relates to a method for controlling an infrared illuminator and a related image-recording device.

BACKGROUND

As people's living standard improves, image-recording devices such as video surveillance devices, camcorders, and cameras with video recording functions are being increasingly used. On such image-recording devices, to take videos less susceptible to the brightness of surroundings, infrared illuminators are often used as supplemental light sources in night or darkness. Besides infrared light, an infrared illuminator also emits a certain amount of visible light. Meanwhile, to turn on an infrared illuminator night and darkness, a light-measuring device is often mounted on the image-recording device to detect the current visible light illuminance and provide a reference for turning on and off the infrared illuminator.

Figure 1:
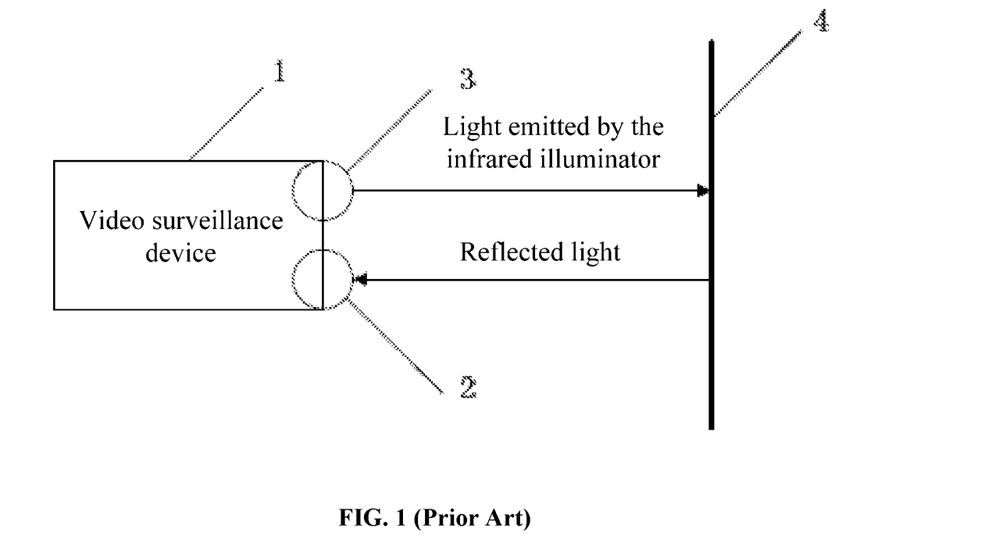
FIG. 1 illustrates the working principles of light-reflection interference in a conventional video surveillance device.

For example, video surveillance devices are used in various occasions. Some of the video surveillance devices include an automatic angle-adjusting function. When a video surveillance device is getting close to the object being filmed or a blocking object (e.g., a wall or a glass cover) is in front of the video surveillance device, the infrared illuminator in the video surveillance device can be turned on. FIG. 1 illustrates the working principles of light-reflection interference in a conventional video surveillance device. As shown in FIG. 1, a blocking object 4 is positioned in front of the video surveillance device 1. When the video surveillance device is located in a relatively dark environment, the light-measuring device in the video surveillance device detects the illuminance of visible light is lower than a preset value, and the video surveillance device 1 turns on the infrared illuminator 3 to provide supplemental light.

However, because the blocking object 4 is in front of the infrared illuminator 3, the supplemental light emitted by the infrared illuminator 3 can be reflected back to the video surveillance device 1. The reflected light can interfere with the light detection of the light-measuring device 2 on the video surveillance device 1. Sometimes, severe interference can cause the video surveillance device to turn on and off the infrared illuminator repeatedly. As a result, the video surveillance device 1 can be damaged, and the images of the video can be adversely affected. The video taken can have impaired quality.

BRIEF SUMMARY OF THE DISCLOSURE

The disclosed device and method are directed to solve or improve, for example, obtaining the actual illuminance of visible light by filtering out the light-reflection interference caused by the infrared illuminator, ensuring the video quality filmed by the image-recording device, and avoiding damages to the image-recording device.

One aspect of the present disclosure provides a method for controlling an infrared illuminator, including: turning on the infrared illuminator in a filming environment to provide light; filtering out light-reflection interference caused by the light to obtain an actual visible illuminance value; and controlling on and off states of the infrared illuminator based on the actual visible illuminance value.

Optionally, controlling on and off states of the infrared illuminator based on the actual visible illuminance value includes comparing the actual visible illuminance value to a preset threshold value includes: if the actual visible illuminance value is larger than the preset threshold value, turning off the infrared illuminator; and if the actual visible illuminance value is smaller than the preset threshold value, turning on the infrared illuminator.

Optionally, before turning on the infrared illuminator, the method further includes: measuring a first infrared illuminance value and a first visible illuminance value in the filming environment; and determining the first visible illuminance value is smaller than the preset threshold value to turn on the infrared illuminator.

Optionally, after turning on the infrared illuminator, the method further includes: measuring a second infrared illuminance value and a second visible illuminance value in the filming environment.

Optionally, the method further includes calculating a scaling factor of the infrared illuminator and storing the scaling factor. The scaling factor is calculated by: turning on the infrared illuminator in a dark room; measuring a third infrared illuminance value and a third visible illuminance value corresponding to light emitted by the infrared illuminator in the dark room; and calculating a ratio of the third visible illuminance value and the third infrared illuminance value to obtain the scaling factor.

Optionally, the actual visible illuminance value is determined by the second visible illuminance value subtracting a product of the scaling factor and a difference between the second infrared illuminance value and the first infrared illuminance value.

Another aspect of the present disclosure provides an image-recording device, including: an infrared illuminator, a light-measuring device, a control module, and a processing module. The control module is configured to turn on and off the infrared illuminator. The processing module is configured to filter out light-reflection interference caused by light emitted by the infrared illuminator to obtain an actual visible illuminance value after the infrared illuminator is turned on.

Optionally, a function of the control module further includes turning on and off the infrared illuminator based on the actual visible illuminance value.

Optionally, if the actual visible illuminance value is higher than a preset threshold value, turning off the infrared illuminator; and if the actual visible illuminance value is lower than the preset threshold value, turning on the infrared illuminator.

Optionally, a function of the control module further includes: before turning on the infrared illuminator: measuring a first infrared illuminance value and a first visible illuminance value in the filming environment; and determining the first visible illuminance value is lower than the preset threshold value to turn on the infrared illuminator.

Optionally, a function of the control module further includes: after turning on the infrared illuminator: measuring a second infrared illuminance value and a second visible illuminance value in the filming environment.

Optionally, a function of the processing module further includes: calculating the actual visible illuminance value by subtracting a product of a scaling factor of the infrared illuminator and a difference between the second infrared illuminance value and the first infrared illuminance value from the second visible illuminance value.

Optionally, the image-recording device further includes: a determining module, configured to determine the scaling factor; and a storage module, configured to store the scaling factor.

Optionally, the scaling factor is obtained by: turning on the infrared illuminator in a dark room, by the controlling module; measuring a third infrared illuminance value and a third visible illuminance value corresponding to light emitted by the infrared illuminator in the dark room, by the determining module; and calculating a ratio of the third visible illuminance value and the third infrared illuminance value to obtain the scaling factor, by the determining module.

BRIEF DESCRIPTION OF THE DRAWINGS

The following drawings are merely examples for illustrative purposes according to the disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

An image-record device in the present disclosure may refer to any type of image-recording apparatus, such as a photo camera, or a video recorder.

Figure 2:
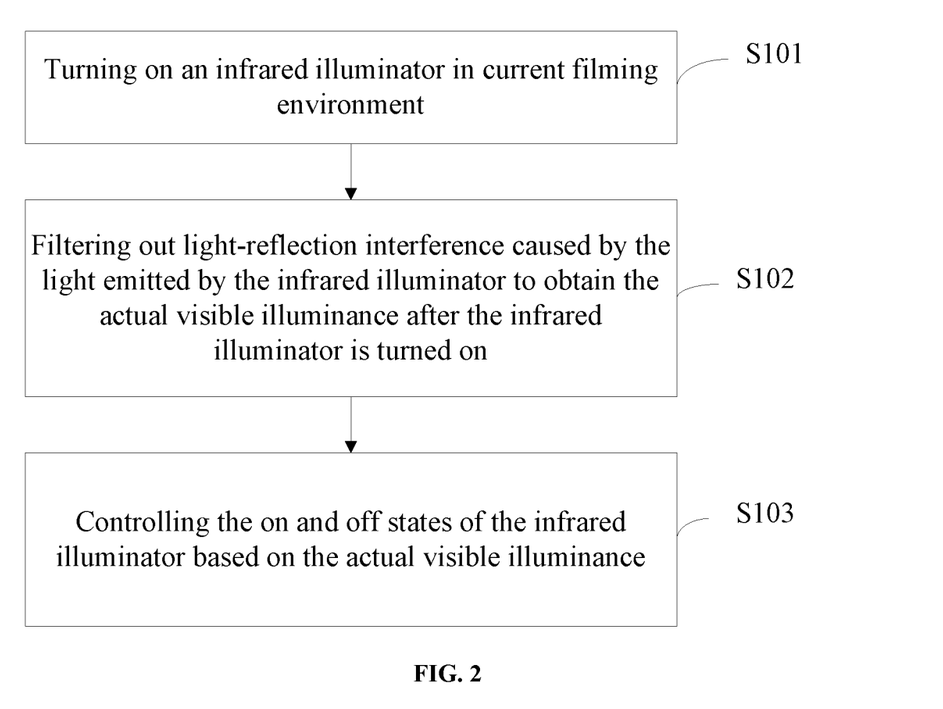
FIG. 2 illustrates an exemplary method for controlling an infrared illuminator consistent with various disclosed embodiments of the present disclosure.

FIG. 2 illustrates an exemplary method for controlling an infrared illuminator provided by the present disclosure. As shown in FIG. 2, the method may include steps S101-S103.

In step S101, the infrared illuminator may be turned on in current filming environment.

Specifically, when the visible illuminance (i.e., illuminance of visible light), detected by the light-measuring device on the image-recording device, is lower than a preset threshold value, the image-recording device may turn on the infrared illuminator to provide supplemental light. Before performing step S101, in some embodiments, the method may further include detecting the infrared illuminance (i.e., illuminance of infrared light) I1 and the visible illuminance S1; and determining the visible illuminance S1 is lower than the preset threshold value, i.e., to turn on the infrared illuminator in current filming environment.

In step S102, light-reflection interference caused by the infrared illuminator may be filtered out to obtain the actual visible illuminance after the infrared illuminator is turned on.

Specifically, because the light emitted by the infrared illuminator may cause light-reflection interference, actual visible illuminance after the infrared illuminator may be obtained by filtering out the light-reflection interference.

In one embodiment, the step S102 may include sub-steps S1021 and S1022 (not labeled).

In step S1021, the infrared illuminance I2 and the visible illuminance S2, in the current filming environment after the infrared illuminator is turned on, may be measured.

Specifically, in one embodiment, the infrared illuminance I2 and the visible illuminance S2 may be measured through the light-measuring device on the image-recording device.

In step S1022, the actual visible illuminance S3 may be calculated using equation $S3=S2-k(I2-I1)$, where k is a scaling factor of the infrared illuminator. Specifically, k equals the ratio of visible illuminance to infrared illuminance, in the light emitted by the infrared illuminator in a dark room.

In some embodiments, the value of k may be determined in advance and stored in the image-recording device. The process to determine the value of k may including the following sub-steps.

First, the infrared illuminator may be turned on in a dark room. The visible illuminance and infrared illuminance, in the light emitted by the infrared illuminator in the dark room, may be measured. Further, the ratio of the visible illuminance to the infrared illuminance, emitted by the infrared illuminator, may be calculated to obtain the scaling factor k. In one embodiment, the light-measuring device may be independent of the image-recording device or may be an external device. For example, the light-measuring device may be a light meter or an illuminance meter. In some other embodiments, the light-measuring device may also be included in or coupled with the image-recording device. For example, a photosensitive device in the image-recording device may be used to measure the visible illuminance and the infrared illuminance. Because the scaling factor k is the only value measured from the infrared illuminator, it may be more convenient to measure the illuminances using an external light meter. In this case, it may be easier to measure the data, and computer programs in the image-recording device may be simplified. When the image-recording device is being used, the data of I1, I2, and S2, i.e., data before and after the infrared illuminator is turned on, may be measured by the light-measuring device inside the image-recording device, in some embodiments. The light-measuring device inside the image-recording device may be a photosensitive device.

In step S103, the infrared illuminator may be controlled to turn on or off based on the actual visible illuminance.

Specifically, if the actual visible illuminance S3 is lower than the preset threshold value, the infrared illuminator may be turned on; and if the actual visible illuminance S3 is higher than the preset threshold value, the infrared illuminator may be turned off.

According to the disclosed method to control an infrared illuminator, by filtering out the light-reflection interference in the light emitted by the infrared illuminator after turning on the infrared illuminator in the current environment, the actual visible illuminance after turning on the infrared illuminator may be obtained. Further, the infrared illuminator may be controlled to turn on or off based on the actual visible illuminance. Because the light-reflection interference caused by the light emitted by the infrared illuminator may be filtered out, the obtained visible illuminance may be the actual visible illuminance. Thus, better videos or images may be taken by the image-recording device, and the image-recording device is less susceptible to damages.

Figure 3:
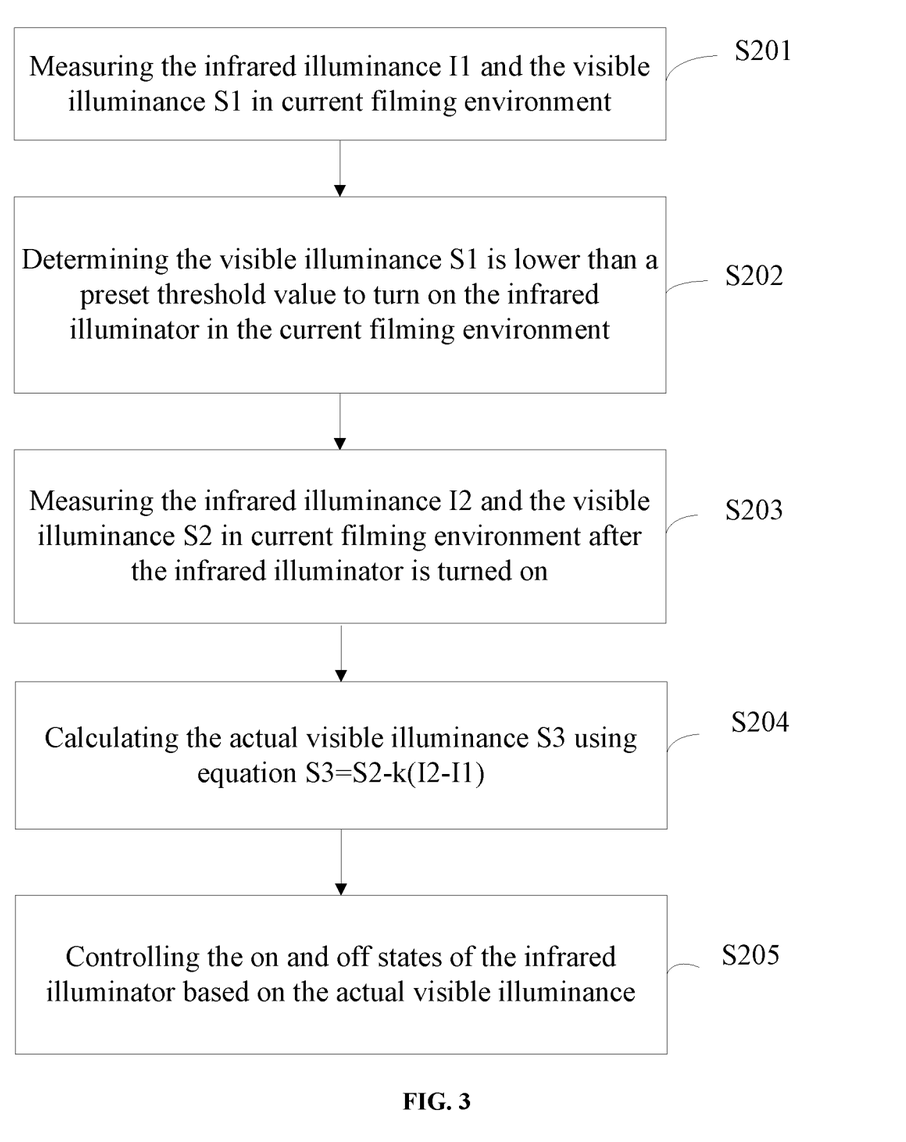
FIG. 3 illustrates another exemplary method for controlling an infrared illuminator consistent with various disclosed embodiments of the present disclosure.

The technical solution illustrated in FIG. 2 is now described in detail. FIG. 3 illustrates another exemplary process to control an infrared illuminator. As shown in FIG. 3, the process may include steps S201-S205.

In step S201, the infrared illuminance I1 and the visible illuminance S1 in current filming environment may be measured.

In step S202, if the visible illuminance S1 is lower than a preset threshold value, the infrared illuminator may be turned on in current filming environment.

In step S203, the infrared illuminance I2 and the visible illuminance S2 in current filming environment, after the infrared illuminator is turned on, may be measured.

In step S204, the actual visible illuminance S3 may be calculated based on equation S3=S2−k (I2−I1), where k, a scaling factor, equals the ratio of the visible illuminance to the infrared illuminance, in the light emitted by the infrared illuminator in a dark room. The value of k may be determined in advance and stored in the image-recording device.

In step S205, the infrared illuminator may be controlled to turn on and off again based on the actual visible illuminance S3.

Specifically, if the actual visible illuminance S3 is lower than the preset threshold value, the infrared illuminator may be turned on; and if the actual visible illuminance S3 is higher than the preset threshold value, the infrared illuminator may be turned off.

For example, the image-recording device may be a video surveillance device. The method to control an infrared illuminator to provide supplemental light may be described as follows. Under normal condition, the infrared illuminator of the video surveillance device may be turned off. At this time, the illuminance measured by the light-measuring device may be the actual light illuminance in the environment. The visible illuminance may be assumed to be S1, and the infrared illuminance may be assured to be I1.

When the light-measuring device detects that the value of S1 satisfies the condition to turn on the infrared illuminator, i.e., the value of S1 is lower than the preset threshold value, the control/processing unit of the video surveillance device may turn on the infrared illuminator. Further, the light-measuring device may measure the light illuminance again. At this time, the measured visible illuminance may be S2, and the measured infrared illuminance may be I2. The control/processing unit of the video surveillance device may follow the process below to calculate the effect of the infrared illuminator on the result of the light detection.

The amount of change in infrared illuminance may be $\Delta I=I2-I1$. $\Delta I$ may be generated or emitted by the infrared illuminator. The effect of the infrared illuminator on the visible illuminance may be associated with $\Delta I$. The actual visible illuminance may be assumed to be S3, that is $\Delta S=S2-S3$, and $\Delta S=k\ \Delta I$.

Thus, when the infrared illuminator is turned on, the actual visible illuminance in the current filming environment may be $S3=S2-k\ \Delta I$.

In one embodiment, the process to filter out the light-reflection interference by the infrared illuminator to measure the visible illuminance may include the following steps. First, the infrared illuminator may be turned on in a dark room. An external light/illuminance meter may be used to measure the visible illuminance and the infrared illuminance emitted by the infrared illuminator. For example, the visible illuminance may be 3.6 and the infrared illuminance may be 7.3. The scaling factor k may be calculated as k=3.6/7.3≈0.4932. Further, based on the on or off states of the infrared illuminator, the processor of the video surveillance device may read out the values of I1, I2, and S2 detected by the photosensitive device inside the video surveillance device. I1 represents the infrared illuminance when the infrared illuminator is turned off, and I1 equals 0.127. I2 and S2 represent the infrared illuminance and the visible illuminance when the infrared illuminator is turned on. For example, I2 equals 3.628 and S2 equals 4.215. The actual visible illuminance S3 of the filming environment may be calculated by the processor of the video surveillance device as S3=4.215−0.4932 (3.628−0.127)=2.488. Further, the actual visible illuminance S3 may be compared to the preset threshold value. If the actual visible illuminance S3 is lower than the preset threshold value, the video surveillance device may determine that the actual visible illuminance in the current filming environment is too low and the infrared illuminator may need to be turned on.

According to the disclosed method to control an infrared illuminator, before turning on the infrared illuminator in current filming environment, the infrared illuminance I1 and the visible illuminance S1 in the current filming environment may be measured. After turning on the infrared illuminator, the infrared illuminance I2 and the visible illuminance S2 in the current filming environment may be measured. The scaling factor k, of the infrared illuminator, may be obtained to filter out the light-reflection interference caused by the light emitted by the infrared illuminator. The actual visible illuminance after turning on the infrared illuminator may be obtained. The actual visible illuminance may be used to determine the on and off states of the infrared illuminator. Accordingly, the filming effect of the image-recording device may be ensured, and damages to the image-recording device may be avoided or reduced.

Figure 4:
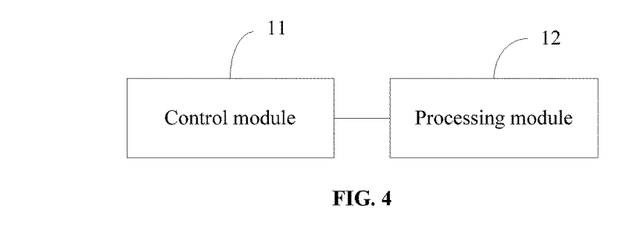
FIG. 4 illustrates an exemplary image-recording device consistent with various disclosed embodiments of the present disclosure.

FIG. 4 illustrates the structure of an exemplary image-recording device provided by the present disclosure. The image-recording device may include an infrared illuminator and a light-measuring device. As shown in FIG. 4, the disclosed image-recording device may include a control module 11 and a processing module 12. The control module 11 may be configured to turn on the infrared illuminator in current filming environment. The processing module 12 may be configured to filter out the light-reflection interference caused by the light emitted by the infrared illuminator and obtain the actual visible illuminance after the infrared illuminator is turned on. The control module 11 may also control the on and off states of the infrared illuminator based on the actual visible illuminance.

Further, the control module 11 may also be configured to turn on the light-measuring device to measure the infrared illuminance I1 and the visible illuminance S1 in the current filming environment before the infrared illuminator is turned on in the current filming environment. The control module 11 may determine the visible illuminance S1 is lower than the preset threshold value. The control module 11 may also measure the infrared illuminance I2 and the visible illuminance S2 in the current filming environment after the infrared illuminator is turned on in the current filming environment.

The processing module 12 may be configured to calculate the actual visible illuminance S3 using the equation S3=S2−k (I2−I1), where k, the scaling factor, equals the ratio of visible illuminance to infrared illuminance, in the light emitted by the infrared illuminator in a dark room.

Further, the control module 11 may also be configured to turn on the infrared illuminator when the actual visible illuminance S3 is lower than the preset threshold value, and turn off the infrared illuminator when the actual visible illuminance S3 is higher than the preset threshold value.

For illustrative purposes, the disclosed image-recording device may be used to execute the technical solutions illustrated in FIGS. 2 and 3. Details of operation may be referred to previous description of FIGS. 2 and 3 and are not repeated herein.

According to the disclosed image-recording device, after the control module turns on the infrared illuminator in the current filming environment, the processing module may filter out the light-reflection interference caused by the light emitted by the infrared illuminator to obtain the actual visible illuminance after the infrared illuminator is turned on. Further, the control module may control the on and off states of the infrared illuminator based on the actual visible illuminance. Because light-reflection interference, caused by the light emitted by the infrared illuminator, is filtered out after the infrared illuminator is turned on, the obtained visible illuminance may be the actual visible illuminance. Accordingly, the filming effect of the image-recording device may be ensured, and damages to the image-recording device may be avoided or reduced.

Figure 5:
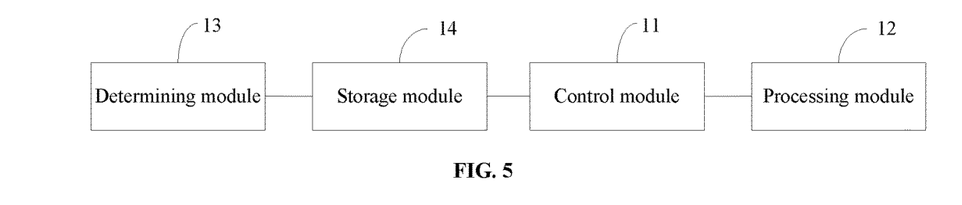
FIG. 5 illustrates another exemplary image-recording device consistent with various disclosed embodiments of the present disclosure.

FIG. 5 illustrates another exemplary structure of the disclosed image-recording device provided by the present disclosure. As shown in FIG. 5, based on the structure shown in FIG. 4, the image-recording device may further include a determining module 13 and a storage module 14. The determining module 13 may be configured to determine the scaling factor k of the infrared illuminator. The storage module 14 may be configured to store the scaling factor k of the infrared illuminator.

Specifically, the control module 11 may be configured to turn on the infrared illuminator in a dark room, and turn on the light-measuring device to measure the visible illuminance and the infrared illuminance in the light emitted by the infrared illuminator in the dark room. The determining module 13 may be configured to calculate the ratio of the visible illuminance to the infrared illuminance based on the visible illuminance and the infrared illuminance in the light emitted by the infrared illuminator in the dark room. The scaling factor k of the infrared illuminator may be obtained.

For illustrative purposes, the disclosed image-recording device may be used to execute the technical solutions illustrated in FIGS. 1 and 2. Details of operation may be referred to previous description of FIGS. 1 and 2 and are not repeated herein.

Figure 6:
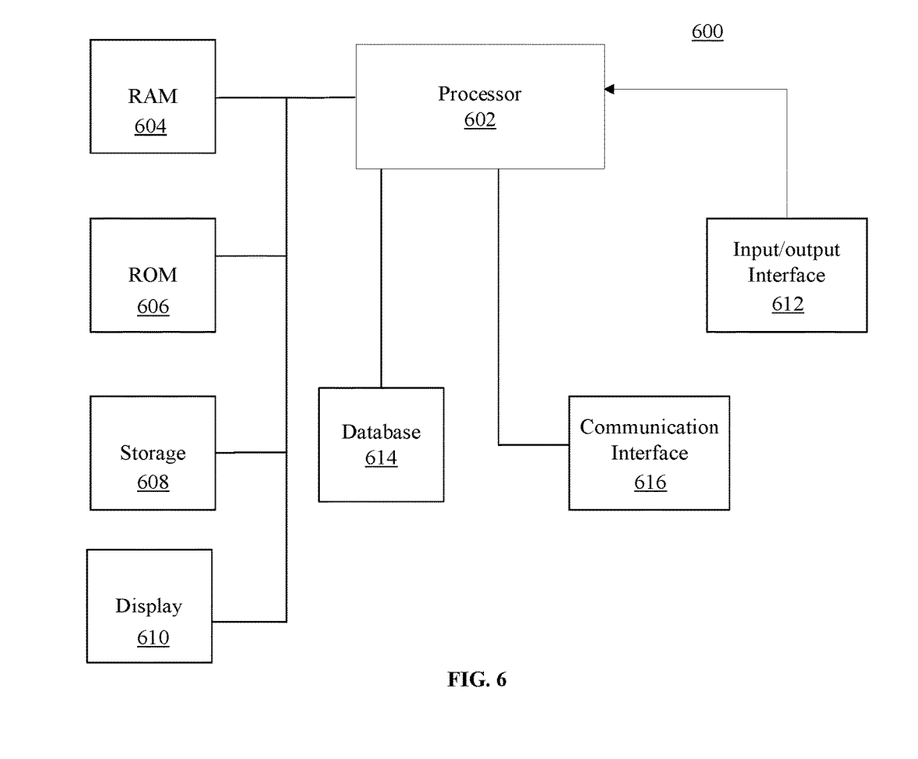
FIG. 6 illustrates a block diagram of an exemplary processing unit used in an image-recording device consistent with various disclosed embodiments of the present disclosure.

FIG. 6 illustrates an exemplary structure of the control and processing unit 600 of the image-recording device. Based on functions, parts of the control and processing unit 600 may correspond to the modules and other related parts in the image-recording device.

The control and processing unit 600 may receive, process, and execute commands from the display apparatus. The control and processing unit 600 may include any appropriately configured computer system. As shown in FIG. 6, control and processing unit 600 may include a processor 602, a random access memory (RAM) 604, a read-only memory (ROM) 606, a storage 608, a display 610, an input/output interface 612, a database 614; and a communication interface 616. Other components may be added and certain devices may be removed without departing from the principles of the disclosed embodiments.

Processor 602 may include any appropriate type of general purpose microprocessor, digital signal processor or microcontroller, and application specific integrated circuit (ASIC). Processor 602 may execute sequences of computer program instructions to perform various processes associated with main unit 600. Computer program instructions may be loaded into RAM 604 for execution by processor 602 from read-only memory 606, or from storage 608. Storage 608 may include any appropriate type of mass storage provided to store any type of information that processor 602 may need to perform the processes. For example, storage 608 may include one or more hard disk devices, optical disk devices, flash disks, or other storage devices to provide storage space.

Display 610 may provide information to a user or an operator of the main unit 600. Display 610 may include any appropriate type of computer display device or electronic device display (e.g., CRT or LCD based devices). Input/output interface 612 may be provided for users to input information into main unit 600 or for the user to receive information from main unit 600. For example, input/output interface 612 may include any appropriate input device, such as a keyboard, a mouse, an electronic tablet, voice communication devices, touch screens, or any other optical or wireless input devices. Further, input/output interface 612 may receive from and/or send to other external devices.

Further, database 614 may include any type of commercial or customized database, and may also include analysis tools for analyzing the information in the databases. Database 614 may be used for storing information for the illuminance calculation and other related information, e.g., the value of the scaling factor k. Communication interface 616 may provide communication connections such that main unit 600 may be accessed remotely and/or communicate with other systems through computer networks or other communication networks via various communication protocols, such as transmission control protocol/internet protocol (TCP/IP), hyper text transfer protocol (HTTP), etc.

In one embodiment, through the communication interface 616, the processor 602 may control the light-measuring device to measure the visible illuminance S1 in the current imaging environment before the infrared illuminator is turned on. The processor 602 may determine if the visible illuminance S1 is lower than the preset threshold value. If the visible illuminance S1 is lower than the preset threshold value, the processor 602 may turn on the infrared illuminator in the current filming environment. Further, after the infrared illuminator is turned on, the processor 602 may control the light-measuring device to measure the visible illuminance S2 and the infrared illuminance I2 in the current imaging environment. The processor 602 may calculate the actual visible illuminance S3 using the equation S3=S2−k (I2−I2), where the scaling factor k of the infrared illuminator may be stored in the data base 214 or other storages such as the storage 608. Based on the actual visible illuminance S3, the processor 602 may control the on and off states of the infrared illuminator. The results of illuminance measurement may be shown to the user or operator through the display 210.

In some embodiments, an image-recording device may use multiple infrared illuminators to control the actual illuminance value in a filming environment. For example, as shown in FIG. 3, the image-recording device may turn on one illuminator to obtain certain level of illuminance. However, in the image-recording device changes its settings (e.g., zooms out), it may need to turn on multiple infrared illuminators to achieve desired luminance level. The image-recording device may then turn on multiple infrared illuminators to light up various locations in the filming environment. The process of checking the actual illuminance level and turning on or off the illuminators may be similar to the process described in relation to FIG. 3.

First, the infrared illuminance I1 and the visible illuminance S1 in current filming environment may be measured. If the visible illuminance S1 is lower than a preset threshold value, after the image-recording device turns on multiple illuminators in the current filming environment. The infrared illuminance I2 and the visible illuminance S2 in current filming environment, after the infrared illuminators are turned on, may be measured. The actual visible illuminance S3 may be calculated based on equation S3=S2−k (I2−I1), where k, a scaling factor, equals the ratio of the visible illuminance to the infrared illuminance, in the light emitted by the infrared illuminator in a dark room. The value of k may be determined in advance and stored in the image-recording device. Finally, the infrared illuminators may be turned on and off again based on the actual visible illuminance S3.

In some embodiments, the image-recording device may divide up the filing environment into multiple areas. Each area may include one or more infrared illuminators. The image-recording device may apply the process as described in FIG. 3 to check the actual visible illuminance value in each divided area. Different areas may have a different desired target values for the actual visible illuminance. The image-recording device may set a low actual visible illuminance value for an area that is not of interesting for recording images. The image-recording device may set a high actual visible illuminance value for an area that is of interesting for recording images.

It should be noted by those skilled in the art that, at least a portion of the steps described in the embodiments provided in the present disclosure may be implemented through computer programs and related hardware. The computer programs may be stored in a readable storage medium. When executing the computer program, the steps described in the disclosed method may be executed. The readable storage medium may include a ROM, a RAM, a magnetic disc, a compact disc, or other suitable storage medium that can be used to store computer programs.

The embodiments disclosed herein are exemplary only. Other applications, advantages, alternations, modifications, or equivalents to the disclosed embodiments are obvious to those skilled in the art and are intended to be encompassed within the scope of the present disclosure.

REFERENCE SIGN LIST

Video surveillance device 1
Light-measuring device 2
Infrared illuminator 3
Blocking object 4
Control module 11
Processing module 12
Determining module 13
Storage module 14
Main unit of the infrared illuminator 600
Processor 602
RAM 604
ROM 606
Storage 608
Display 610
Input/output interface 612
Data base 614
Communication interface 616

What is claimed is:

1. A method for controlling an infrared illuminator, comprising:
    measuring a first infrared illuminance value and a first visible illuminance value in a filming environment;
    upon determining that the first visible illuminance value is smaller than a preset threshold value, turning on the infrared illuminator in the filming environment to provide light;
    measuring a second infrared illuminance value and a second visible illuminance value in the filming environment after the infrared illuminator is turned on;
    calculating a scaling factor of the infrared illuminator according to a third infrared illuminance value and a third visible illuminance value measured in a dark room, and storing the scaling factor;
    determining an actual visible illuminance value by: subtracting a product of the scaling factor and a difference between the second infrared illuminance value and the first infrared illuminance value from the second visible illuminance value; and
    controlling on and off states of the infrared illuminator based on the actual visible illuminance value.

2. The method according to claim 1, wherein controlling on and off states of the infrared illuminator based on the actual visible illuminance value includes comparing the actual visible illuminance value to the preset threshold value, including:
    if the actual visible illuminance value is larger than the preset threshold value, turning off the infrared illuminator; and
    if the actual visible illuminance value is smaller than the preset threshold value, turning on the infrared illuminator.

3. The method according to claim 2, wherein the scaling factor is calculated by:
    turning on the infrared illuminator in the dark room;
    measuring the third infrared illuminance value and the third visible illuminance value corresponding to light emitted by the infrared illuminator in the dark room; and
    calculating a ratio of the third visible illuminance value and the third infrared illuminance value to obtain the scaling factor.

4. An image-recording device, comprising: at least one infrared illuminator, a control module, and a processing module, wherein:
    the control module is configured to:
        measure a first infrared illuminance value and a first visible illuminance value in a filming environment;
        determine the first visible illuminance value is smaller than a preset threshold value to turn on the at least one infrared illuminator in the filming environment to provide light; and measure a second infrared illuminance value and a second visible illuminance value in the filming environment after the at least one infrared illuminator is turned on; and the processing module is configured to:

calculate a scaling factor of the at least one infrared illuminator according to a third infrared illuminance value and a third visible illuminance value measured in a dark room, and store the scaling factor; and calculate an actual visible illuminance value by subtracting a product of the scaling factor and a difference between the second infrared illuminance value and the first infrared illuminance value from the second visible illuminance value; and the control module is further configured to control on and off states of the at least one infrared illuminator based on the actual visible illuminance value.

5. The image-recording device according to claim 4, wherein the control module is further configured to:

if the actual visible illuminance value is higher than a preset threshold value, turn off the at least one infrared illuminator; and if the actual visible illuminance value is lower than the preset threshold value, turn on the at least one infrared illuminator.

6. The image-recording device according to claim 4, further comprising:

a determining module, configured to determine the scaling factor; and a storage module, configured to store the scaling factor.

7. The image-recording device according to claim 6, wherein the scaling factor is obtained by:

turning on the at least one infrared illuminator in the dark room, by the controlling module;

measuring the third infrared illuminance value and the third visible illuminance value corresponding to light emitted by the at least one infrared illuminator in the dark room, by the determining module; and calculating a ratio of the third visible illuminance value and the third infrared illuminance value to obtain the scaling factor, by the determining module.

8. The image-recording device according to claim 4, comprising two or more of the at least one infrared illuminator, wherein:

the image-recording device is configured to divide the filming environment into a plurality of filming areas; and each of the plurality of filming areas corresponds to at least one infrared illuminator.

9. The image-recording device according to claim 8, wherein the plurality of filming areas correspond to different preset threshold values.

* * * * *